United States Patent [19]

Bailey

[11] Patent Number: 5,067,458

[45] Date of Patent: Nov. 26, 1991

[54] FUEL COMBUSTION SYSTEM AND METHOD OF OPERATION FOR AN OTTO-CYCLE INTERNAL COMBUSTION ENGINE

[75] Inventor: John M. Bailey, Dunlap, Ill.

[73] Assignee: Caterpillar Inc., Peoria, Ill.

[21] Appl. No.: 438,277

[22] Filed: Nov. 20, 1989

Related U.S. Application Data

[63] Continuation-in-part of Ser. No. 328,976, Mar. 27, 1989, abandoned.

[51] Int. Cl.⁵ ............................................. F02B 19/02
[52] U.S. Cl. ..................................... 123/292; 123/293
[58] Field of Search ................ 123/292, 293, 269, 286

[56] References Cited

U.S. PATENT DOCUMENTS

| | | | |
|---|---|---|---|
| 2,793,628 | 5/1957 | Floyd | 123/28 |
| 2,884,913 | 5/1959 | Heintz | 123/28 |
| 3,035,559 | 5/1962 | Brandes et al. | 123/269 |
| 3,057,334 | 10/1962 | Bailey | 123/32 |
| 3,168,083 | 2/1965 | Buchanan | 123/292 |
| 3,765,381 | 10/1973 | Nilsson | 123/33 VC |
| 3,985,111 | 10/1976 | Turkish | 123/254 |
| 4,124,012 | 11/1978 | Fuller, Jr. | 123/182 |
| 4,223,645 | 9/1980 | Nohira et al. | 123/292 |
| 4,224,902 | 9/1980 | Binder et al. | 123/286 |
| 4,300,497 | 11/1981 | Webber | 123/254 |
| 4,372,264 | 2/1983 | Trucco | 123/292 |
| 4,401,072 | 8/1983 | Ito et al. | 123/292 |
| 4,406,260 | 9/1983 | Burley | 123/292 |
| 4,442,807 | 4/1984 | Latsch et al. | 123/263 |
| 4,532,899 | 8/1985 | Lorts | 123/292 |
| 4,738,227 | 4/1988 | Kamo et al. | 123/23 |
| 4,838,213 | 6/1989 | Gerace | 123/27 R |

FOREIGN PATENT DOCUMENTS

| | | |
|---|---|---|
| 660762 | 4/1963 | Canada ................................. 123/269 |
| 1451642 | 6/1969 | Fed. Rep. of Germany . |
| 2145206 | 4/1972 | Fed. Rep. of Germany . |
| 2443986A1 | 4/1976 | Fed. Rep. of Germany . |
| 2909183A1 | 9/1980 | Fed. Rep. of Germany . |
| 2928021 | 2/1983 | Fed. Rep. of Germany . |
| 1408644 | 12/1972 | United Kingdom . |
| 8400994 | 3/1984 | World Int. Prop. O. . |

OTHER PUBLICATIONS

Publication Serial No. 368293, W. Von Mallinckrodt, May 11, 1943.
Internal Combustion Engine Fundamentals, by John B. Heywood, excerpts pp. 437-450, published 1988, by McGraw-Hill, Inc. (no month provided).
Internal Combustion Engines and Air Pollution, by Edward F. Obert, excerpts pp. 1-25, published 1973, by Intext Educational Publishers (no month provided).
Diesel The Man & The Engine, by Morton Grosser, excerpts pp. 139-142, published 1978, by Book Press (no month provided).

Primary Examiner—Tony M. Argenbright
Assistant Examiner—Robert E. Mates
Attorney, Agent, or Firm—Anthony N. Woloch

[57] ABSTRACT

A fuel combustion system for an Otto-cycle internal combustion engine including a main combustion chamber and an auxiliary combustion chamber. Timing of ignition is effected by opening a control valve device during a latter portion of the compression phase which permits a pressurized combustible mixture to flow from the main combustion chamber and into the auxiliary combustion chamber where the combustible mixture therein is ignited. Hot burning gases emanating from the auxiliary combustion chamber through a suitable directing device provide single or multiple and penetrating sources of ignition for the bulk of the combustible mixture present in the main combustion chamber. This arrangement provides a very reliable and long life ignition system for Otto-cycle engines and is especially advantageous for engines whichburn a relatively lean combustible mixture.

23 Claims, 6 Drawing Sheets

Fig. 1.

Fig_2.

FUEL COMBUSTION SYSTEM AND METHOD OF OPERATION FOR AN OTTO-CYCLE INTERNAL COMBUSTION ENGINE

DESCRIPTION

1. Technical Field

The present invention relates generally to Otto-cycle internal combustion engines and, more particularly, to a fuel combustion system for effecting ignition of a combustible mixture and method of operation therefor.

2. Background Art

For purposes herein, an Otto-cycle engine is generally defined as an internal combustion engine which operates on the Otto cycle wherein the phases of intake, compression, combustion, expansion, and exhaust occur sequentially (though possibly with selected periods of overlap). Such Otto-cycle engines include, but are not limited to, 4-stroke-cycle as well as 2-stroke-cycle reciprocating engines. Moreover, in Otto-cycle engines, as herein defined, the fuel and air are pre-mixed (by, for example a carburetor) to form a fairly homogeneous combustible mixture which is admitted to the engine combustion chamber during the intake phase of the cycle. One example of an Otto-cycle engine is generally shown in U.S. Pat. No. 4,124,012 issued to Fuller, Jr. on Nov. 7, 1978.

Control of the power output of an Otto-cycle engine is dependent on the mass of the combustible mixture burned in the combustion chamber per cycle. Such control is effected by a throttle, such as a butterfly valve, which variably restricts the amount of combustible mixture (without necessarily or significantly changing the fuel/air ratio) entering the combustion chamber during the intake phase. During the compression phase, the combustible mixture is compressed within the closed confines of the combustion chamber. Near the end of the compression phase (e.g., near top dead center in a reciprocating engine), an ignition device ignites the combustible mixture to form hot burning gases which, during the expansion phase of the cycle, expand against a movable piston and thereby create power.

High voltage spark ignition systems have been used for many years to effect the ignition of gasoline or gas (i.e., gaseous fuel) burned in an Otto-cycle engine. These systems have been the subject of many years of research and development and today are reasonably reliable and have an acceptable service life for most gasoline and gas engines. Nevertheless, presently available spark plugs are susceptible to various problems such as high voltage arc-over, gap erosion, shorts and fouling. As gas engines are increasingly used for cogeneration to provide both electricity and heat for residential, commercial, and industrial applications, the need for greater reliability and even longer maintenance-free life of such engines becomes important. Consequently, it would be desirable if an ignition system were available which would be free from spark plugs and their associated problems at least during normal engine operation.

Moreover, the trend toward burning lean (i.e., lean fuel/air ratio) combustible mixtures in Otto-cycle gas engines is making it much more difficult to achieve stable and reliable combustion of the combustible mixtures as well as attaining adequate service life with presently available high voltage spark plug systems.

Lean-burn versions of the Otto-cycle engine have been developed in order to significantly reduce the amount of nitrogen oxides ($NO_x$) produced. In a stoichiometric version of an Otto-cycle engine, $NO_x$ is caused by very high peak temperatures in the combustion chamber. Such high peak temperatures facilitate oxidation or "burning" of nitrogen with oxygen, both of which are part of the air present in the combustion chamber. The amount of $NO_x$ formed increases with the increased temperature level, increases with the length of time during which the high temperature exists and also increases with increased concentration of oxygen.

In lean-burn Otto-cycle engines, the combustible mixture inducted into the combustion chamber contains much more air than is necessary to completely burn the fuel. The greater mass of the lean combustible mixture keeps the temperature of that burning mixture from rising as high as the temperature produced by burning a stoichiometric combustible mixture having the same amount of fuel. Because, as previously mentioned the amount of $NO_x$ emissions is directly proportional to the peak temperatures generated in the combustion chamber, these lean-burn Otto-cycle engines produce NOx levels of about 1 to 2 g/HP-HR compared with $NO_x$ levels of about 20 g/HP-HR produced by stoichiometric Otto-cycle engines.

Nevertheless, the peak cylinder pressure in lean-burn Otto-cycle engines is about 50-75% greater than that in a stoichiometric-burn Otto-cycle engine producing the same power output. This higher peak cylinder pressure has led designers of such engines to use a relatively higher energy, higher voltage, spark ignition system to create an adequately large spark in the very dense combustible mixture. In addition, lean-burn operation has required a longer spark duration to ensure ignition under those conditions. Thus, lean-burn Otto-cycle engines typically provide a more severe operating environment for spark plugs as compared to stoichiometric-burn Otto-cycle engines.

As shown in, for example, U.S. Pat. No. 4,442,807 issued to Latsch et al. on Apr. 17, 1984, a number of lean-burn Otto-cycle engines have been developed which use a small ignition chamber to help achieve stable combustion of the very lean combustible mixtures. These small ignition chambers typically have a volume equal to about 1-3% of the total clearance volume of the main combustion chamber and have a spark plug positioned in the ignition chamber. The lean combustible mixture is admitted to the main combustion chamber during the intake phase and is immediately free to flow into this ignition chamber. Because the spark produced by a typical spark plug is a fairly small ignition source, many lean-burn Otto-cycle engines also enrich the ignition chamber with additional fuel. The fuel/air ratio of the combustible mixture within the ignition chamber thus becomes or approaches stoichiometric which is more readily ignitable and thereby helps ensure a consistent ignition therein. One example of such an arrangement is shown in U.S. Pat. No. 3,985,111 issued to Turkish on Oct. 12, 1976. Late in the compression phase, the combustible mixture in the ignition chamber is ignited by the spark plug. The hot, burning products of combustion are then discharged into the main combustion chamber where the bulk of the lean combustible mixture is thereby ignited. When operating correctly, this arrangement permits the use of a very lean-burn operation, a NOx level of about 1 g/HP-HR, very consistent cycle to cycle firing and excellent specific fuel consumption for an Otto-cycle engine. However, the use of the spark plug in this arrangement may still present the aforementioned problems of high voltage arc over, spark plug fouling etc.. Moreover, the arrangements which use a fuel enrichening device to enhance the operation of the spark plug add complexity and cost to such engines.

The present invention is directed to overcoming one or more of the problems as set forth above.

DISCLOSURE OF THE INVENTION

In one aspect of the present invention a method is disclosed of combusting a predetermined combustible mixture of fuel and air in an Otto-cycle internal combustion engine including a main combustion chamber and an auxiliary combustion chamber arranged in intermittent fluid communication therewith comprising the steps of:

a) admitting the combustible mixture into the main combustion chamber during an intake phase of the cycle;

b) compressing and thereby pressurizing the combustible mixture in the main combustion chamber during a compression phase of the cycle;

c) during a latter portion of the compression phase, admitting a portion of pressurized combustible mixture from the main combustion chamber into the auxiliary combustion chamber;

d) igniting the portion of combustible mixture in the auxiliary combustion chamber and thereby forming expanding burning gases; and e) directing the expanding burning gases of the auxiliary combustion chamber into the main combustion chamber to cause ignition and burning of the remaining combustible mixture in the main combustion chamber.

In another aspect of the present invention a fuel combustion system is disclosed for an Otto-cycle internal combustion engine comprising:

a main combustion chamber;

first control valve means for admitting a predetermined combustible mixture of fuel and air into the main combustion chamber during an intake phase of the cycle;

piston means for compressing and thereby pressurizing the combustible mixture in the main combustion chamber during a compression phase of the cycle;

an auxiliary combustion chamber arranged in intermittent fluid communication with the main combustion chamber at a location downstream of the first control valve means;

second control valve means for intermittently opening and blocking fluid communication between the main combustion chamber and the auxiliary combustion chamber, said second control valve means being operable to be sequentially i) closed throughout a first portion of the compression phase, ii) opened during a latter portion of the compression phase to admit a predetermined portion of the pressurized combustible mixture into the auxiliary combustion chamber, and iii) closed no later than about the beginning of the next compression phase; and igniting means for igniting the portion of combustible mixture which is admitted to the auxiliary combustion chamber.

The present invention provides a very reliable and long-life ignition system for Otto-cycle gas or gasoline engines. Moreover, the present invention is advantageous for Otto-cycle engines which burn lean combustible mixtures in order to produce extremely low $NO_x$ emissions and excellent fuel consumption for an Otto-cycle engine.

BEST MODE FOR CARRYING OUT THE INVENTION

Referring to FIGS. 1-9, wherein similar reference characters designate similar elements or features throughout these figures, there is shown three exemplary embodiments of the improved fuel combustion system of the present invention.

Figure 1:
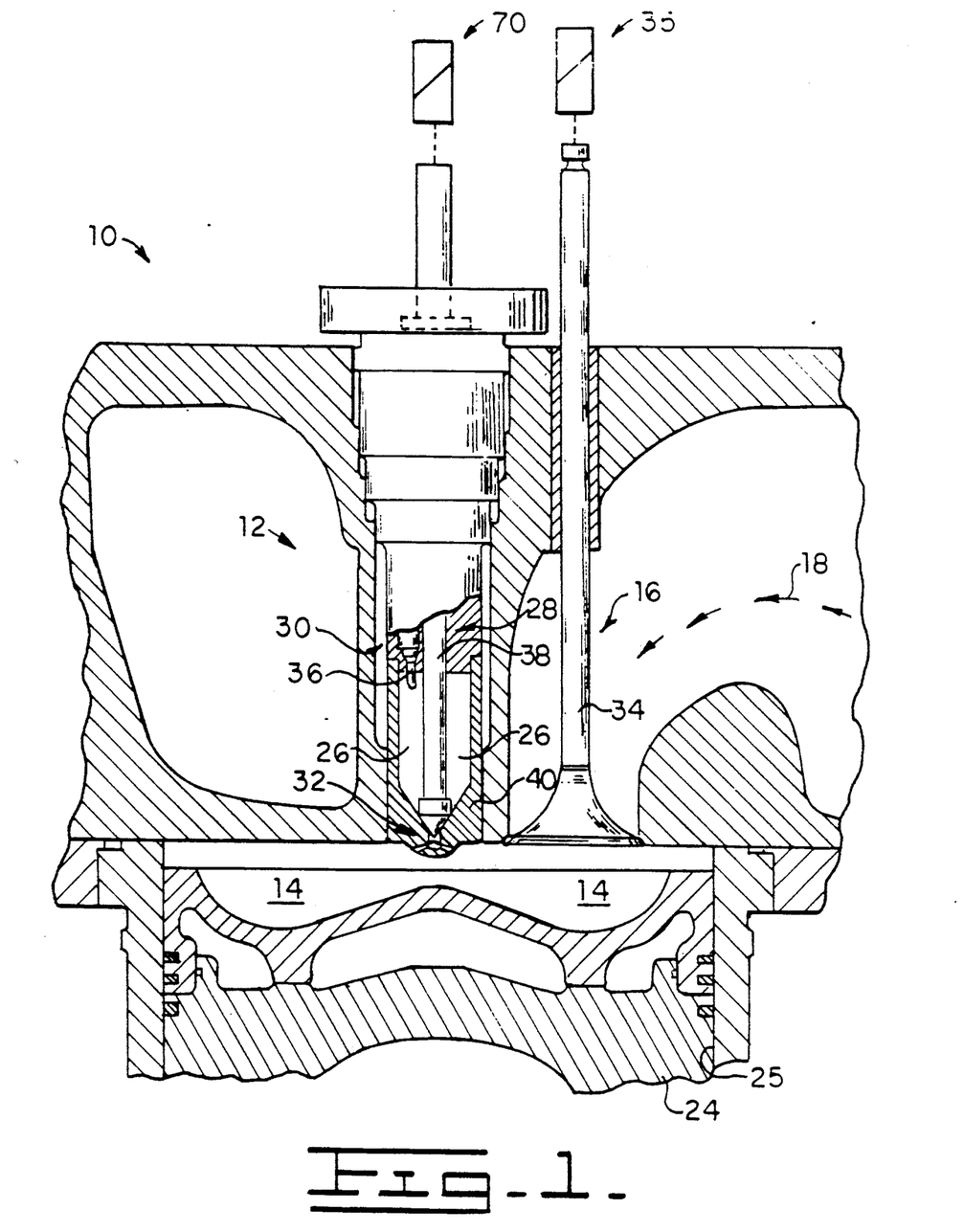
FIG. 1 is a diagrammatic partial cross-sectional side elevational view of a first embodiment of the improved fuel combustion system as incorporated in an Otto-cycle internal combustion engine.

Referring to FIG. 1, an Otto-cycle internal combustion engine 10 is generally illustrated having a fuel combustion system 12. The fuel combustion system 12 comprises a main combustion chamber 14, a first control valve means 16 for admitting a predetermined combustible mixture 18 of fuel and intake air directly into the main combustion chamber 14 during an intake phase of the Otto cycle, a piston or piston means 24 movable in a cylinder 25 for compressing and thereby pressurizing the combustible mixture in the main combustion chamber 14 during a compression phase of the cycle, an auxiliary combustion chamber 26 which is arranged in intermittent fluid communication with the main combustion chamber 14 at a location downstream of the first control valve means 16, a second control valve means or device 28 for intermittently opening and blocking fluid communication between the main combustion chamber 14 and the auxiliary combustion chamber 26, an igniting means or device 30 for igniting the portion of combustible mixture which is admitted into the auxiliary combustion chamber 26, and a directing means or device 32 for directing the expanding burning gases of the ignited portion of combustible mixture from the auxiliary combustion chamber 26 and into the main combustion chamber 14.

The first control valve means 16 may include, for example, one or more conventional poppet-type intake valves 34. Each intake valve 34 is axially movable and actuated by a device 35 which, for example, may be a mechanical valve train or other mechanically-controlled device. Alternatively, the device 35 may be an electro-hydraulic or electro-pneumatic actuator which is electronically-controlled. Alternatively, the first control valve means 16 may include one or more intake ports which are formed in the cylinder 25 and which, during engine operation, are opened and closed by the piston 24 or some other device.

Preferably, the auxiliary combustion chamber 26 is thermally insulated to retain the heat generated therein. The thermal insulation may be provided by defining an annular dead air gap around the outside walls of the auxiliary combustion chamber 26 and/or by forming or coating the inside walls or surfaces of the auxiliary combustion chamber 26 with a suitable high temperature insulating material such as a ceramic. Moreover, except for the passage(s) opened when the second valve means is opened, the auxiliary combustion chamber is sealed to minimize the escape of gases therefrom. The volume of the auxiliary combustion chamber 26 is chosen to be smaller than the volume of the main combustion chamber 14 and is preferably chosen to be about 1 to 5% of the total clearance volume of the main combustion chamber 14.

The igniting means 30 is positioned in the auxiliary combustion chamber 26 and preferably includes a glow plug 36. The glow plug 36 is adapted to be electrically energized to a predetermined elevated temperature which is sufficient to almost instantaneously ignite the combustible mixture which comes into contact with the glow plug. The glow plug 36 may either be continuously energized throughout engine operation or may be energized only during engine startup and until the auxiliary combustion chamber 26 is sufficiently heated up. If the glow plug 36 is deenergized after the auxiliary combustion chamber 26 has sufficiently heated up, the igniting means 30 may at that point simply include the relatively hot inside walls of the auxiliary combustion chamber 26 as well as the relatively hot residual gases remaining in the auxiliary combustion chamber 26 from the previous engine cycle. Alternatively, a spark plug may be substituted for the glow plug 36 although such an arrangement is less desirable because it may experience one or more of the aforementioned problems usually associated with a spark plug.

If the engine 10 is intended to normally burn a relatively lean fuel/air combustible mixture, it may be desirable to provide a fuel enrichening means which is activated or operable during startup and warm-up of the engine to help initiate rapid combustion of the combustible mixture. Either the portion of combustible mixture admitted to the auxiliary combustion chamber or the entire combustible mixture inducted into the main combustion chamber during the intake phase, may be enriched with additional fuel so that the fuel/air ratio thereof is increased to an approximately stoichiometric value which, of course, is easier to ignite. In either case, after the engine approaches or reaches its normal operating conditions, the fuel enrichening means may be deactivated.

Figure 2:
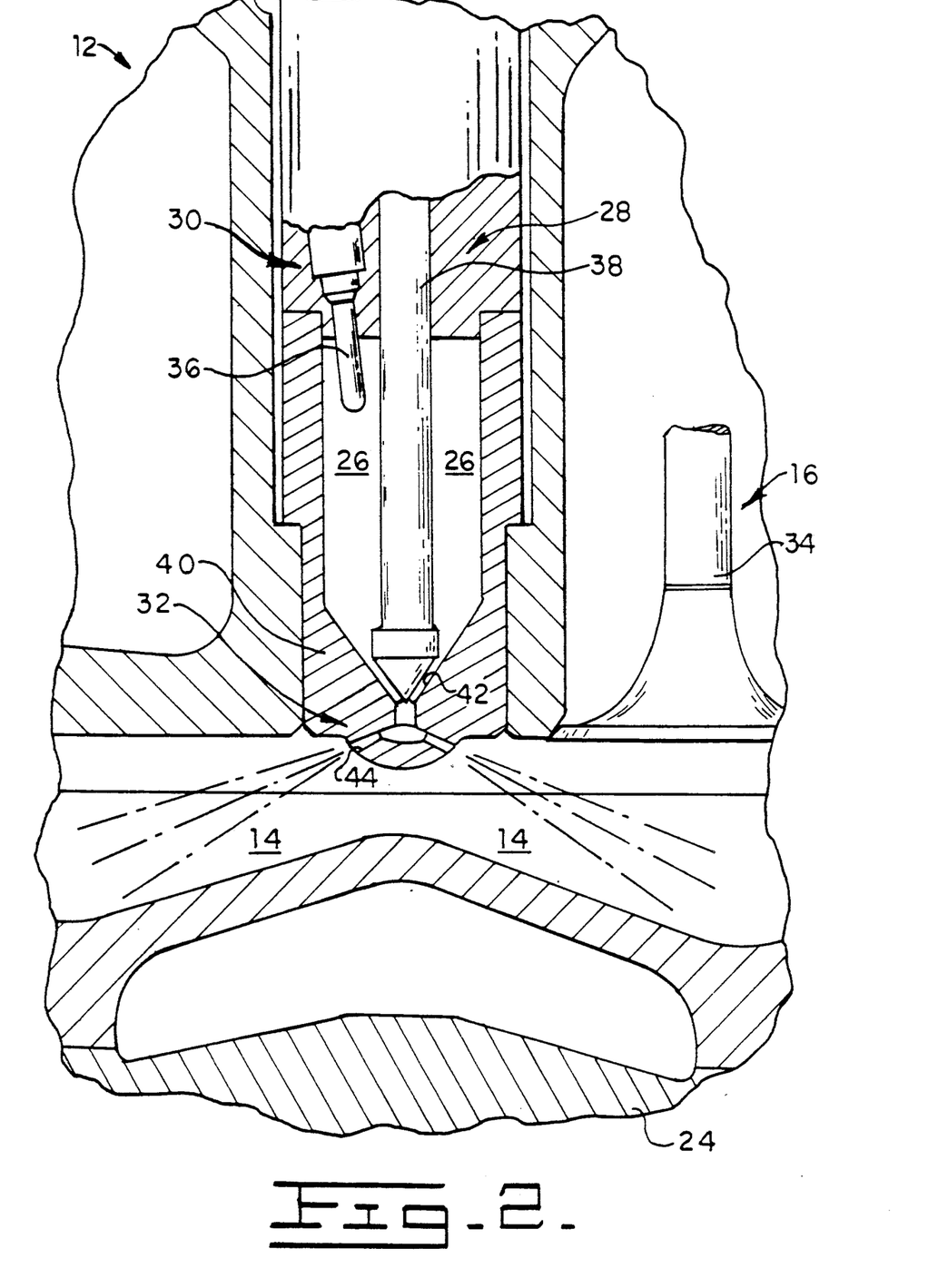
FIG. 2 is a diagrammatic enlarged partial view of FIG. 1.

FIGS. 1 and 2 show a first embodiment of the present invention in which the second control valve means 28 includes an inwardly-opening needle-type valve 38 and a valve body 40 having a valve seat 42 formed therein. Moreover, the directing means 32 preferably includes a plurality of injection orifices 44 radially projecting into the main combustion chamber 14 and arranged on the second control valve means 28 at a location downstream of the valve seat 42.

Figure 5:
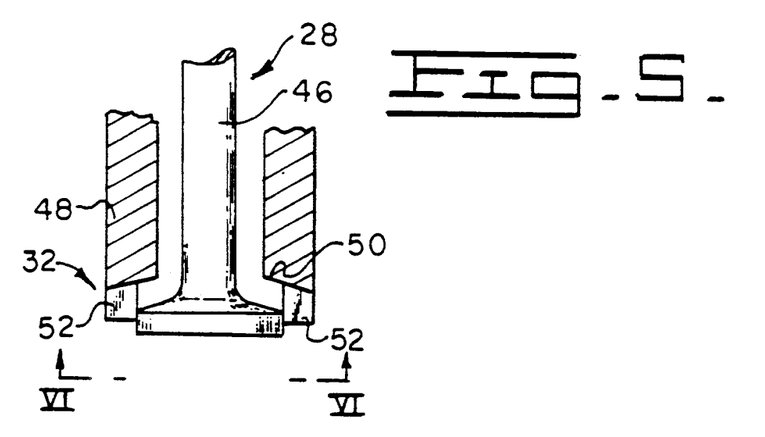
FIG. 5 is a diagrammatic view similar to FIG. 4 but showing the directing means in an opened position.
Figure 6:
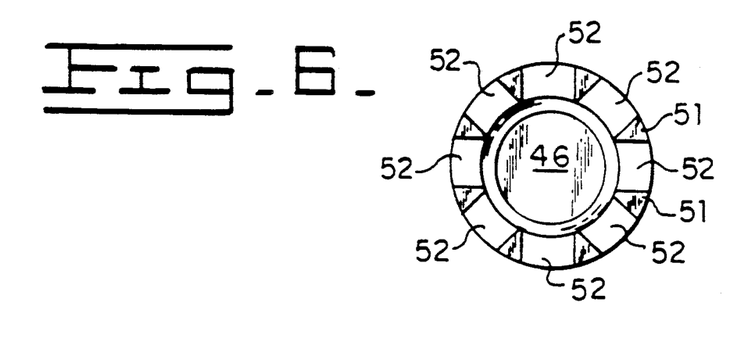
FIG. 6 is a diagrammatic partial end view of FIG. 5 taken along line VI—VI.

FIGS. 3 to 6 show a second embodiment of the present invention in which the second control valve means 28 includes an outwardly-opening poppet-type valve 46 and valve body 48 having an annular valve seat 50 therefor. Moreover as shown in FIG. 6, the directing means 32 preferably includes a plurality of radially spaced merlons 51 connected to a lower end portion of the valve body 48 and projecting into the main combustion chamber 14. Between each pair of opposing merlons 51 there is defined a channel 52. Alternatively, the directing means 32 may simply include the annular passage defined between the valve seat 50 and the valve 46 when the valve 46 is opened.

Figure 7:
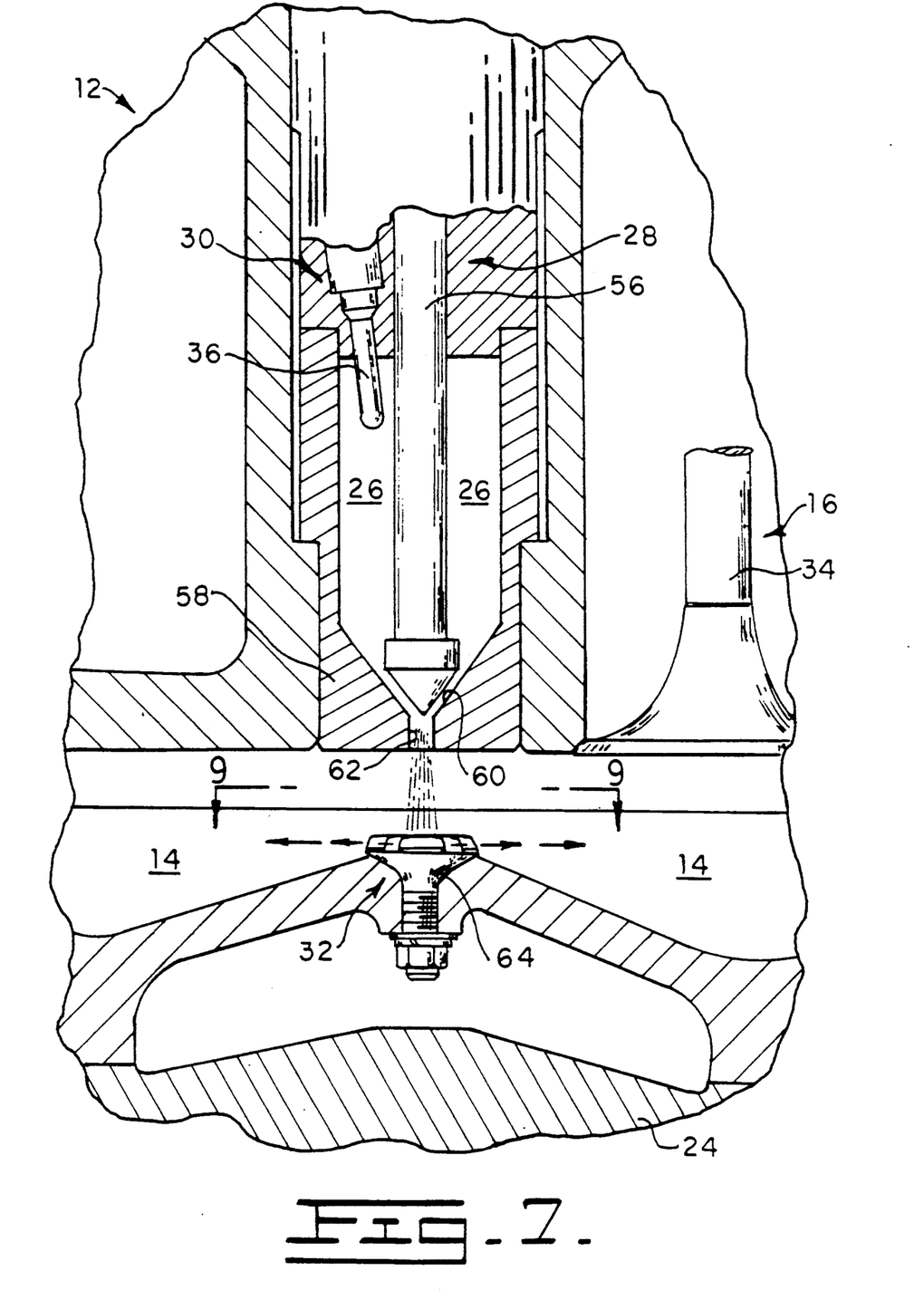
FIG. 7 is a diagrammatic view similar to FIGS. 2 and 3 but showing a third embodiment of the improved fuel combustion system.
Figure 8:
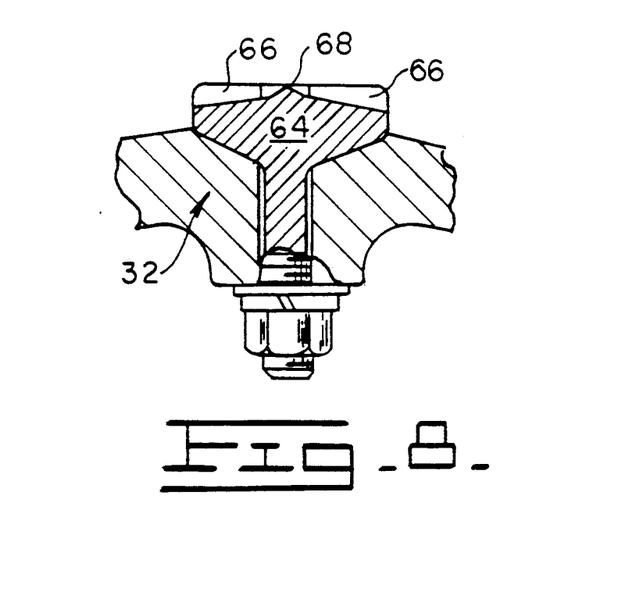
FIG. 8 is a diagrammatic partial cross-sectional view of FIG. 9 taken along line 8—8.
Figure 9:
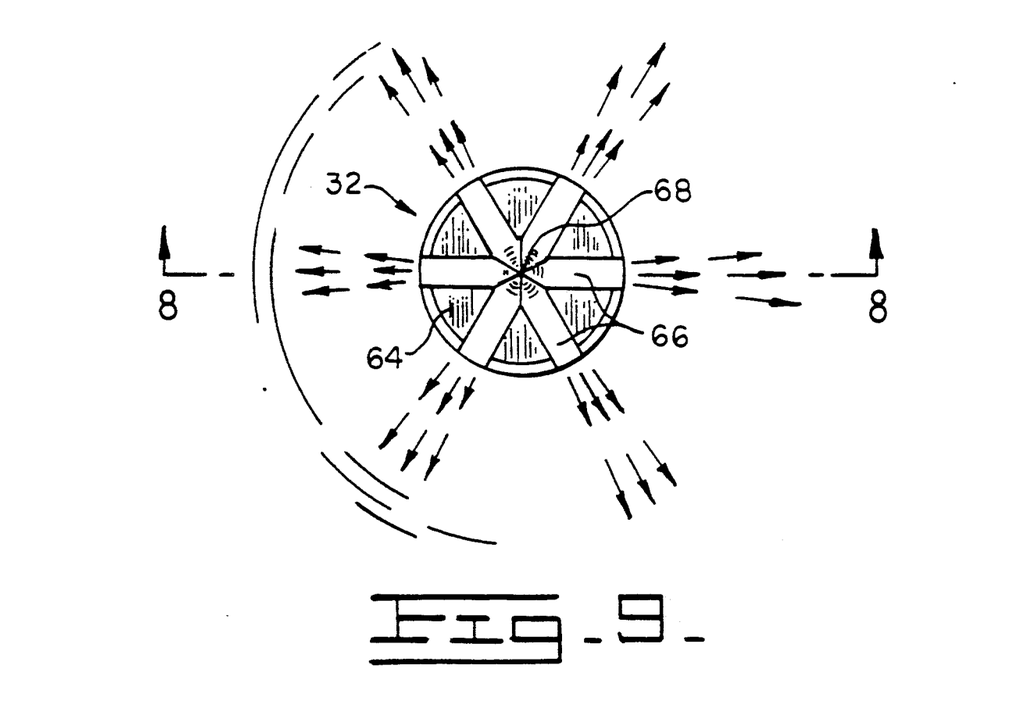
FIG. 9 is a diagrammatic enlarged partial plan view of FIG. 7 taken along line 9—9.

FIGS. 7 to 9 show a third embodiment of the present invention in which the second control valve means 28 includes an inwardly-opening needle-type valve 56 and a valve body 58 having a valve seat 60 formed thereon. Moreover, the directing means 32 includes a single injection orifice 62 formed in the valve body 58 and a heat-resistant distributor or heat plug 64 connected to or integrally formed with a crown portion of the piston 24. As shown in FIGS. 8 and 9, an upper portion of the distributor plug 64 preferably includes a plurality of mutually spaced and radially-extending grooves 66 which all intersect at a central upper portion 68 of the distributor plug 64. The central upper portion 68 of the distributor plug 64 is aligned with and unobstructively faces the single injection orifice 62. Alternatively, the upper portion of the distributor plug 64 may simply include a flat, convex or concave deflecting face which unobstructively faces the single injection orifice 62.

Preferably, the second control valve means 28 is electronically controlled by, for example, an electrical solenoid 70 (FIG. 1) having an axially movable armature (not shown) connected to the valve 38,46,56, a fixed electromagnetic coil (not shown), and a fixed stop (not shown) to limit the displacement of the armature. Alternatively, an electro-hydraulic or electro-pneumatic actuator may be substituted for the solenoid 70 in order to provide the motive force for accomplishing the requisite valve events. Such electronic controls, of course, provide a means for varying the timing of ignition in accordance with various sensed engine operating parameters. Alternatively, the second control valve means 28 may be mechanically controlled by connecting it, for example, to a valve train assembly of the engine 10.

INDUSTRIAL APPLICABILITY

By provision of the improved fuel combustion system 12 of the present invention, a reliable long-life ignition system is provided for an Otto-cycle internal combustion engine. Exemplary operation will now be described with respect to the first embodiment shown in FIGS. 1 to 2.

Prior to starting the engine 10, the glow plug 36 is electrically energized so that its exposed surface projecting in the auxiliary combustion chamber 26 heats up to a very high temperature. Compared with the spark produced by a spark plug, the glow plug 36 advantageously provides a relatively larger ignition source. Upon cranking the engine, a combustible mixture 18 of fuel and intake air is admitted into the main combustion chamber 14 during an intake phase of the Otto cycle. During a compression phase, the combustible mixture 18 is compressed by the piston 24 within the confines of the main combustion chamber 14.

During a latter portion of the compression phase as the piston 24 approaches its top dead center position and at or just prior to the time desired for ignition to occur (i.e., possibly allowing advanced time for ignition delay of the combustible mixture and/or movement of the second control valve means 28), the solenoid 70 is de-energized which permits the armature to lift due to the force of the cylinder pressure against the needle valve 38. As the needle valve 38 lifts and the armature moves away from the electromagnetic coil, its force drops by a function related to the square of the distance between the armature and the coil. Consequently, this force drops very quickly and the needle valve 38 opens very suddenly. Opening of the needle valve 38 continues until the armature approaches its stop at which time air is squeezed, from between two opposing surfaces on the armature and stop, which acts as a damping medium to prevent undue shock.

Upon opening the needle valve 38, a portion of the pressurized combustible mixture 18 flows very rapidly into the auxiliary combustion chamber 26. Upon surface contact with the heated glow plug 36, the combustible mixture is ignited, gas pressure rises, and the resulting expanding burning gases are discharged from the auxiliary combustion chamber 26 and into the main combustion chamber 14 through the injection orifices 44. Thus, the timing of ignition of the combustible mixture during each cycle is controlled by opening the second control valve means which in this case includes opening the needle valve 38. The second control valve means 28 is opened for a preselected time during a latter portion of the compression phase. Preferably, the second control valve means 28 is opened beginning at a preselected time during the second half of the compression phase wherein "the second half of the compression phase" is defined as that part of the compression phase in which the volume of the main combustion chamber (14) is less than half of its value at the beginning of the compression phase. In a reciprocating Otto-cycle engine, the step of opening the second control valve means 28 preferably occurs at from about 75 to 0 crankshaft angle degrees before top dead center of the compression phase.

An important function of the auxiliary combustion chamber 26 and directing means 32 is to transform and propagate the initial flame started around the glow plug 36 into one or more flame jets in the main combustion chamber 14. The flame jets are advantageous because they have a substantial hot surface area that can ignite even extremely lean or diluted combustible mixtures in a repeatable manner. In FIGS. 1 and 2 the hot, burning gases emanating from the auxiliary combustion chamber 26 are directed through the multiple injection orifices 44 which spray mutually spaced high velocity jets or streams into the main combustion chamber 14. The hot jets penetrate evenly throughout the dense combustible mixture in the main combustion chamber 14 and thereby provide multiple ignition sources in order to achieve thorough combustion of combustible mixture residing in the main combustion chamber 14.

Figure 3:
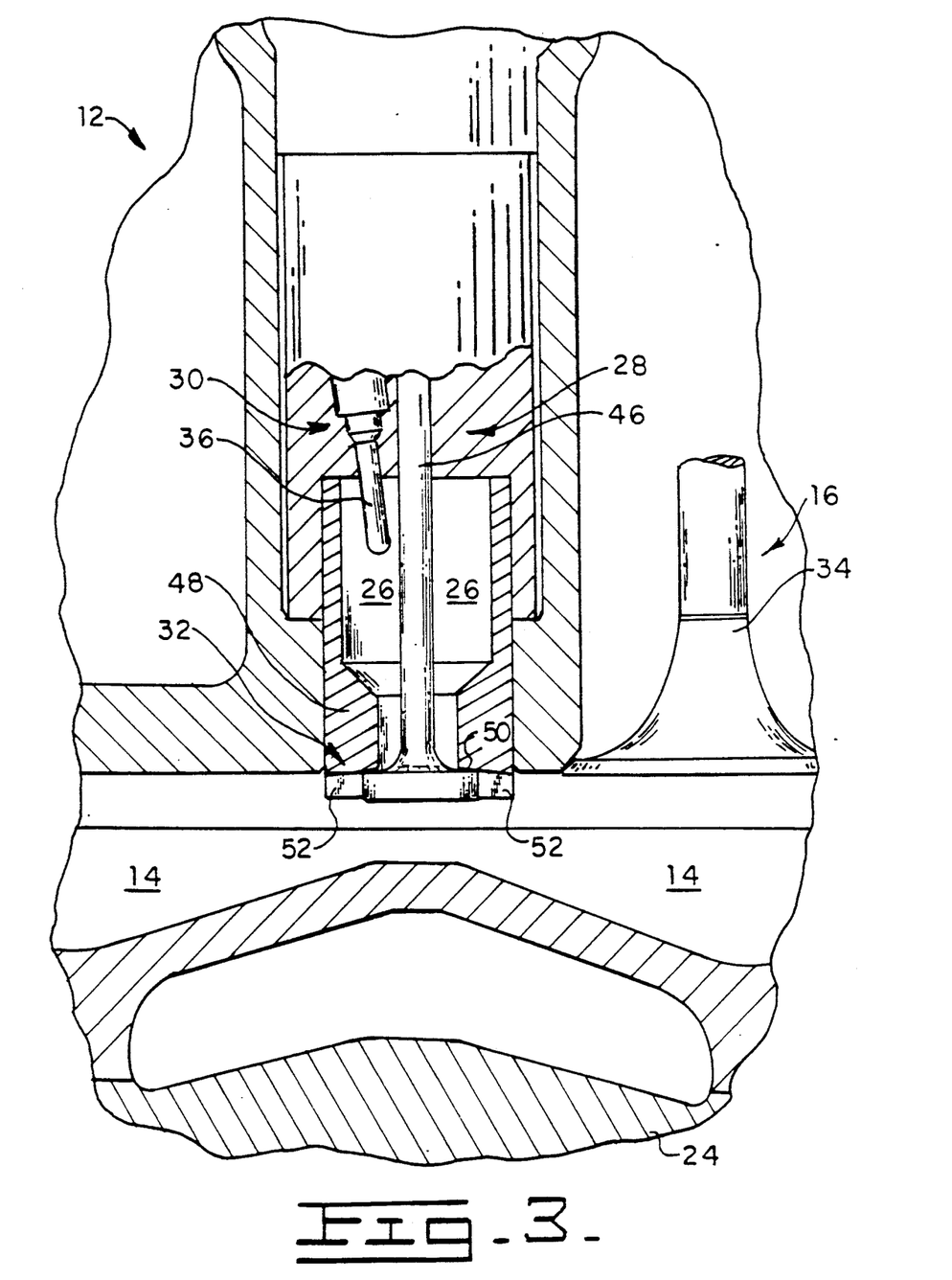
FIG. 3 is a diagrammatic view similar to FIG. 2 but showing a second embodiment of the improved fuel combustion engine.
Figure 4:
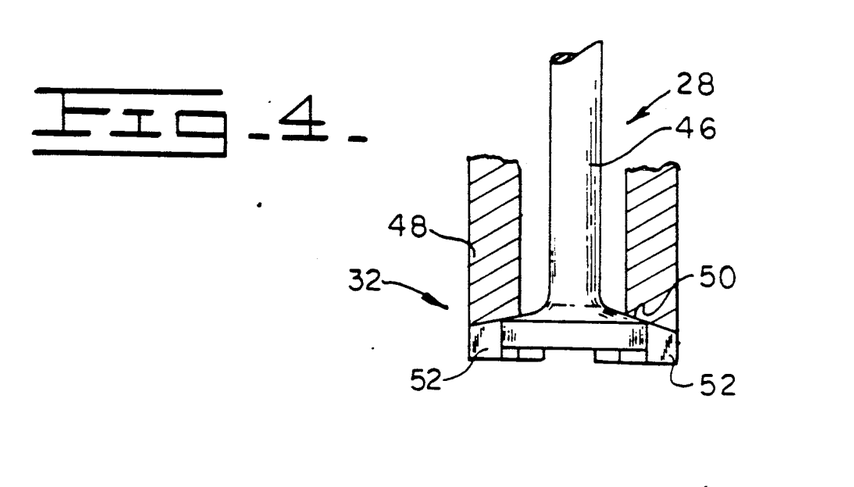
FIG. 4 is a diagrammatic enlarged partial view of FIG. 3 showing the directing means in a closed position.

In the second alternative embodiment of FIGS. 3, 5 and 6, timing of ignition is controlled by opening the outwardly-opening poppet-type valve 46. Following ingress of pressurized combustible mixture 18 into the auxiliary combustion chamber 26 and ignition, the hot, burning gases are discharged from the auxiliary combustion chamber 26 through the still-opened valve 46. The valve 46, in cooperation with the radial channels 52, divides the burning gases into mutually spaced and radially directed hot jets or streams which likewise provide multiple penetrating ignition sources.

In the third alternative embodiment of FIGS. 7 to 9, timing of ignition is controlled by opening the inwardly-opening needle-type valve 56. Following ingress of pressurized combustible mixture 18 into the auxiliary combustion chamber 26 and ignition, the hot, burning gases are discharged from the auxiliary combustion chamber 26 through the single orifice 62 which faces the distributor plug 64. The distributor plug 64 deflects the hot burning gases through the grooves 66 which divide the burning gases into mutually spaced and radially directed hot jets or streams.

Following discharge of the auxiliary combustion chamber contents and ignition of the combustible mixture in the main combustion chamber 14, the burning gases in the main combustion chamber 14 expand against the movable piston 24 which, for example, transmits power through a connecting rod and crank mechanism to a drive shaft. As the piston 24 descends on the expansion phase of the Otto cycle, the pressure decreases in the main combustion chamber 14 and the auxiliary combustion chamber 26. At some preselected time, the coil is re-energized, forcing the valve 38,46,56 against its seat 42,50,60. Alternatively, the solenoid 70 or other device may be arranged to close the second control valve means 28 when the solenoid 70 is deenergized and to open the second control valve means 28 when the solenoid 70 is energized.

The timing for closure of the second control valve means 28 may be selected from a fairly wide range of the engine cycle, spanning from about the latter portion of the expansion phase to no later than about the beginning of the next compression phase, although the following considerations should provide some guidance in the selection.

One consideration is to prevent premature ignition of a charge of combustible mixture once it is inducted into the main combustion chamber 14. For example, a conservative approach to minimizing premature ignition is to close the second control valve means 28 at a preselected time no later than about the beginning of the next intake phase.

On the other hand, it may be possible leave the second control valve means 28 open not only during the expansion and exhaust phases but also during all or part of the intake phase. This relatively later timing of closure will not result in premature ignition provided there is negligible gas flow between the main chamber 14 and the auxiliary chamber 26 during the intake phase. However, the second control valve means 28 should be closed no later than about the beginning of the next compression phase. This is because the charge in the main combustion chamber 14 begins to pressurize at this time and therefore, if not blocked by the second control valve means 28, would flow into the auxiliary combustion chamber 26 in a significant amount.

Another consideration is to provide adequate cooling of the valve 38,46,56 which may form part of the second control valve means 28. For example, closing the second control valve means 28 early during the exhaust phase maximizes the time during which heat transfer can occur between the relatively hot valve 38,46,56 and its seat 42,50,60. Such cooling of the valve 38,46,56 prolongs its life and minimizes the possibility that it would cause premature ignition by surface contact with the charge of combustible mixture present in the main combustion chamber 14.

For some engines, it may be desirable to close the second control valve means 28 even earlier than the exhaust phase, for example, during a latter portion of the expansion phase, in order to trap some relatively high temperature residual gases in the auxiliary combustion chamber 26. Such trapped gases would then be available to help cause ignition after contacting the next charge of combustible mixture admitted therein when the second control valve means 28 is again opened. However, one should avoid closing the second control valve means 28 too early during the expansion phase, otherwise, excessive pressure might be trapped in the auxiliary combustion chamber 26. Such trapped excessive pressure would undesirably inhibit rapid in-flow of the next charge of combustible mixture when the second control valve means 28 is again opened to effect ignition.

After the engine 10 is started and the auxiliary combustion chamber 26 heats up, the glow plug 36 may be de-energized provided the temperature of the walls or any residual gas inside the auxiliary combustion chamber reaches a sufficient magnitude to effect ignition of the combustible mixture flowing therein. Alternatively, it may be desirable at that point to simply reduce the energy level of the glow plug 36 in order to maintain some minimal temperature level which ensures ignition of the combustible mixture.

Other aspects, objects, and advantages of this invention can be obtained from a study of the drawings, the disclosure, and the appended claims.

I claim:

1. A method of combusting a predetermined combustible mixture of fuel and air in an Otto-cycle internal combustion engine including a main combustion chamber, first control valve means for admitting the combustible mixture into the main combustion chamber, an auxiliary combustion chamber, second control valve means for opening and blocking fluid communication between the main combustion chamber and the auxiliary combustion chamber comprising the steps of:
   a) admitting the combustible mixture into the main combustion chamber during an intake phase of the cycle;
   b) compressing and thereby pressurizing the combustible mixture in the main combustion chamber during a compression phase of the cycle;
   c) opening the second control valve means at a predetermined time during a latter portion of the compression phase in order to admit a portion of pressurized combustible mixture into the auxiliary combustion chamber;
   d) igniting the portion of combustible mixture admitted to the auxiliary combustion chamber and thereby forming expanding burning gases;
   e) directing the expanding burning gases from the auxiliary combustion chamber into the main combustion chamber in order to penetrate and cause ignition and burning of the remaining pressurized combustible mixture in the main combustion chamber; and
   f) closing the second control valve means at a predetermined time prior to about the beginning of the next compression phase.

2. The method of claim 1 wherein the step of closing the second control valve means occurs prior to about the beginning of the next intake phase.

3. The method of claim 1 wherein the step of directing the expanding burning gases from the auxiliary combustion chamber and into the main combustion chamber includes the step of forming the expanding gases into distinct and mutually spaced streams which penetrate and provide multiple ignition sources for the remaining pressurized combustible mixture in the main combustion chamber.

4. The method of claim 1 wherein the step of opening the second control valve means occurs during the second half of the compression phase.

5. The method of claim 4 wherein the second half of the compression phase is defined as that part of the compression phase in which the volume of the main combustion chamber is less than half of its value at the beginning of the compression phase.

6. The method of claim 1 wherein the auxiliary combustion chamber includes a glow plug and the step of igniting the portion of combustible mixture in the auxiliary combustion chamber includes the step of continuously energizing the glow plug during engine operation so that the glow plug is heated to a predetermined elevated temperature which is sufficient to cause ignition of the portion of pressurized combustible mixture which is admitted to the auxiliary combustion chamber.

7. A fuel combustion system for an Otto-cycle internal combustion engine comprising:
   a main combustion chamber;
   first control valve means for admitting a predetermined combustible mixture of air and fuel into the main combustion chamber during an intake phase of the cycle;
   piston means for compressing and thereby pressurizing the combustible mixture in the main combustion chamber during a compression phase of the cycle;
   an auxiliary combustion chamber arranged in intermittent fluid communication with the main combustion chamber at a location downstream of the first control valve means;
   second control valve means for intermittently opening and blocking fluid communication between the main combustion chamber and the auxiliary combustion chamber, said second control valve means being operable to be sequentially i) closed throughout a first portion of a compression phase of the cycle, ii) opened during a latter portion of the compression phase to admit a portion of the pressurized combustible mixture into the auxiliary combustion chamber, and iii) closed prior to about the beginning of the next compression phase; and
   igniting means for igniting the portion of combustible mixture which is admitted to the auxiliary combustion chamber.

8. The fuel combustion system of claim 7 wherein said second control valve means is operable to be closed prior to the beginning of and throughout an intake phase of the cycle.

9. The fuel combustion system of claim 7 wherein the volume of the auxiliary combustion chamber is smaller than that of the main combustion chamber.

10. The fuel combustion system of claim 9 wherein the volume of the auxiliary combustion chamber is chosen to be from about one to five percent of the total clearance volume of the main combustion chamber.

11. The fuel combustion system of claim 7 wherein the auxiliary combustion chamber includes thermally-insulated walls which are adapted to maintain an elevated temperature therein during engine operation.

12. The fuel combustion system of claim 11 wherein the igniting means includes the thermally-insulated walls of the auxiliary combustion chamber.

13. The fuel combustion system of claim 7 wherein the igniting means includes a glow plug positioned in the auxiliary combustion chamber, said glow plug being adapted to be continuously energized during engine operation to a predetermined elevated temperature which is sufficient to cause ignition of the portion of pressurized combustible mixture which is admitted into the auxiliary combustion chamber.

14. The fuel combustion system of claim 7 wherein the igniting means includes the relatively hot residual gases remaining in the auxiliary combustion chamber from the previous cycle.

15. The fuel combustion system of claim 7 further including directing means for directing the expanding burning gases of the ignited portion of combustible mixture from the auxiliary combustion chamber and into the main combustion chamber which penetrate and cause ignition and burning of the remaining pressurized combustible mixture in the main combustion chamber.

16. The fuel combustion system of claim 15 wherein said directing means directs the expanding burning gases from the auxiliary combustion chamber and into the main combustion chamber in the form of mutually-spaced streams which provide multiple ignition sources for the remaining pressurized combustible mixture in the main combustion chamber.

17. The fuel combustion system of claim 15 wherein the second control valve means includes an inwardly-opening needle type valve and a valve body having a valve seat formed therein, said directing means including a plurality of injection orifices arranged on the valve body at a location downstream of the valve seat and projecting into the main combustion chamber.

18. The fuel combustion system of claim 15 wherein the second control valve means includes a poppet-type valve and a valve body having a valve seat formed thereon.

19. The fuel combustion system of claim 18 wherein said directing means includes a plurality of radially-directed and peripherally-spaced merlons formed on an end portion of the valve body and projecting into the main combustion chamber, each pair of opposing merlons defining a channel therebetween.

20. The fuel combustion system of claim 15 wherein the second control valve means includes an inwardly-opening needle valve and a valve body having a valve seat and a single injection orifice formed thereon, said directing means including a distributor plug connected to the piston means and having a plurality of radially-extending grooves which intersect one another at a location aligned with and unobstructively facing the single injection orifice.

21. The fuel combustion system of claim 15 wherein the second control valve means includes a needle valve and a valve body having a valve seat and a single orifice formed thereon, said directing means including a heat plug connected to the piston means and having a deflecting face facing the single orifice.

22. The fuel combustion system of claim 15 wherein the second control valve means includes a needle valve and a valve body having a valve seat and a single orifice formed thereon, said directing means being integrally formed with the piston means and having a deflecting face facing the single orifice.

23. A fuel combustion system for an Otto-cycle internal combustion engine comprising:

a main combustion chamber;

first control valve means for admitting a predetermined combustible mixture of air and fuel into the main combustion chamber during an intake phase of the cycle;

piston means for compressing and thereby pressurizing the combustible mixture in the main combustion chamber during a compression phase of the cycle;

an auxiliary combustion chamber arranged in intermittent fluid communication with the main combustion chamber at a location downstream of the first control valve means;

second control valve means for intermittently opening and blocking fluid communication between the main combustion chamber and the auxiliary combustion chamber, said second control valve means being operable to be sequentially i) closed throughout an intake phase and a first portion a latter portion of the compression phase to admit a portion of the pressurized combustible mixture into the auxiliary combustion chamber, and iii) closed prior to about the beginning of the next intake phase; and igniting means for igniting the portion of combustible mixture which is admitted to the auxiliary combustion chamber.

* * * * *

UNITED STATES PATENT AND TRADEMARK OFFICE
CERTIFICATE OF CORRECTION

PATENT NO. : 5,067,458
DATED : November 26, 1991
INVENTOR(S) : JOHN M. BAILEY

It is certified that error appears in the above-identified patent and that said Letters Patent is hereby corrected as shown below:

Claim 23, column 12, line 38, after "first portion" insert --of a compression phase of the cycle, ii) opened during--.

Signed and Sealed this

Twenty-third Day of March, 1993

Attest:

STEPHEN G. KUNIN

Attesting Officer

Acting Commissioner of Patents and Trademarks